United States Patent [19]
Wagener

[11] Patent Number: 6,113,439
[45] Date of Patent: Sep. 5, 2000

[54] ADAPTER WITH A BASE HOUSING FOR A BUS BAR SYSTEM HAVING A NUMBER OF BUS BARS

[75] Inventor: Hans Wagener, Dietzhölztal, Germany

[73] Assignee: Rittal-Werk Rudolf Loh GmbH & Co. KG, Herborn, Germany

[21] Appl. No.: 09/211,633

[22] Filed: Dec. 15, 1998

[30]    Foreign Application Priority Data

Dec. 15, 1997 [DE] Germany ............................ 197 55 844

[51] Int. Cl.$^7$ ........................................................ H01R 4/48

[52] U.S. Cl. ............................................................... 439/817

[58] Field of Search .................................... 439/817, 819, 439/212

[56]       References Cited

FOREIGN PATENT DOCUMENTS

| AS 11 63 937 | 2/1964 | Austria . |
| 34 13 358 A1 | 10/1985 | Germany . |
| 42 44 238 A1 | 7/1994 | Germany . |

*Primary Examiner*—Lincoln Donovan
*Assistant Examiner*—Javaid Nasri
*Attorney, Agent, or Firm*—Pauley Petersen Kinne & Fejer

[57]              ABSTRACT

An adapter for a base housing to which suspension hooks are attached, is accessible for the insertion of connecting contacts to connect contact rails with bus bars. A pre-assembled unit including the contact support, a spring element and a connecting contact is snapped into a snap-in receiver void of the base housing in the area of the base housing suspension hook and makes definite connections between the bus bar, the connecting contact and the contact rail.

15 Claims, 3 Drawing Sheets

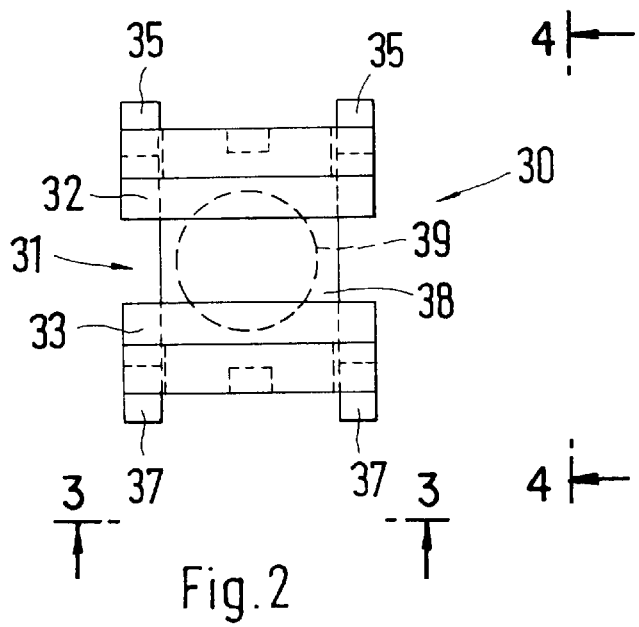
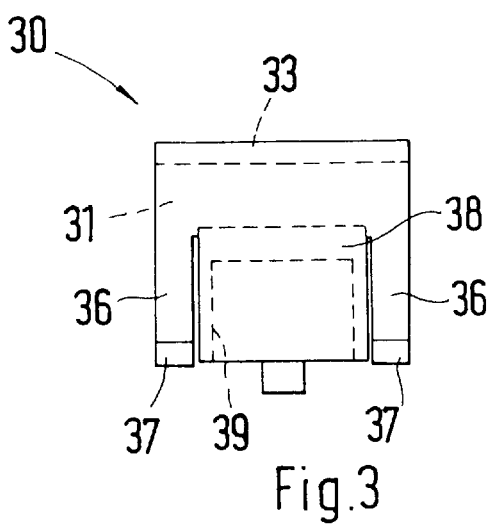 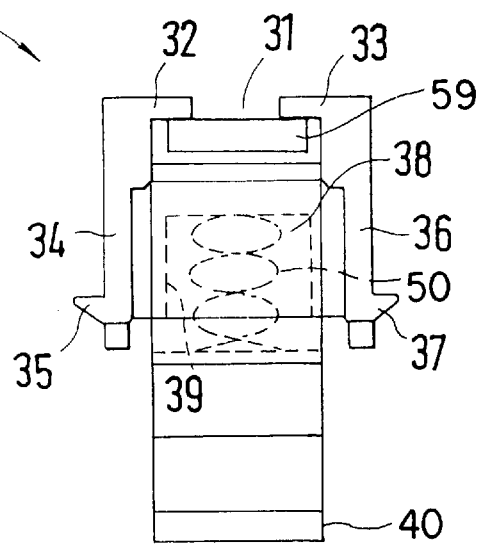

ADAPTER WITH A BASE HOUSING FOR A BUS BAR SYSTEM HAVING A NUMBER OF BUS BARS

BACKGROUND OF THE INVENTION

1. Field of the Invention

This invention relates to an adapter for a base housing to which suspension hooks have been attached. These adapters will correspond to the number of bus bars of a bus bar system and are offset with respect to each other in a longitudinal direction of the base housing in a manner corresponding to a distance between the bus bars. The adapters are accessible for the insertion of connecting contact rails inserted through contact rail receptacles formed into a top of the base housing. The adapters are oriented in the longitudinal direction and connect the contact rails with the bus bars.

2. Description of Prior Art

With known adapters of this type, the mounting of the connecting contacts in the base housing provides considerable difficulties in assuring: 1) a definite electrical connection between the contact rail and the connecting contacts, and 2) after the adapter has been suspended, the connecting contact provides a definite electrical connection with the bus bar.

SUMMARY OF THE INVENTION

It is one object of this invention to create an adapter of the type mentioned at the outset, wherein the connecting contacts can be placed into the base housing by a simple assembly and wherein the connecting contacts then assure an electrical connection with the associated contact rail and the associated bus bar.

In accordance with this invention, this object is attained with an area of the suspension hooks. The contact rail receptacles have snap-in receiver voids for receiving contact supports having snap-in springs, and holding S-shaped connecting contacts with sections placed at right angles to each other. The contact supports assure that the connecting contacts can only be limitedly vertically displaced under spring tension. Positional terms such as "vertical" and "upper" will be recognized as established with respect to the view of FIG. 1. The upper end section of the connecting contact is introduced into a chamber of the contact support, which is aligned with the contact rail receptacle and offers additional space for the introduction of a contact rail. The lower end section of the connecting contact is maintained in a receptacle facing the underside of the base housing and projects from this receptacle with a contact point.

With this design, the contact support with its spring element and the appropriately angled connecting contact together constitute a pre-assembled unit which merely needs to be snapped into the base housing.

In the process, the lower end section of the connecting contact automatically enters the receptacle provided in the suspension hook and projects out of the receptacle with its contact point. The chamber in the contact support provides space for the associated contact rail, with an end thereof simply introduced above the upper end section of the connecting contact, and in the process providing a definite electrical connection between the contact rail and the connecting contact when the upper end section of the connecting contact is pressed under spring tension against the inserted contact rail. The lower end section of the connecting contact is resilient and is placed under tension against the inserted bus bar, whose top is supported against the center section of the connecting contact. In this way, the bus bar is also definitely connected with the connecting contact.

In accordance with one embodiment, the receptacle in the suspension hook is also embodied as a snap-in receptacle with a snap-in shoulder facing the front end of the lower end section of the connecting contact, and the lower end section is maintained positioned in the suspension hook.

For easy disengagement of the snap-in shoulders from the suspension hook, the suspension hook has an opening below the snap-in shoulder.

The contact point of the lower end section of the connecting contact is formed by bending it upward in a V-shape.

The snapped-in seating of the contact support in the snap-in receiver void of the base housing is achieved in that, on the sides oriented parallel with the contact rail receptacles, the contact support has respectively two snap-in springs with outward oriented snap-in shoulders, which are guided in vertical grooves of the snap-in receiver voids of the base housing and extend behind these grooves with the snap-in shoulders in the area of the underside of the base housing, or snap into the snap-in receiver voids of the base housing, wherein the snap-in connection of the contact supports to the receiver voids permit the required limited vertical displacement of the contact support.

In accordance with one embodiment, the cover wall, which closes off the chamber of the contact support toward the top, is divided into two support strips in the longitudinal direction of the contact rail receptacles, and the connecting contact is also accessible from the direction of the top of the contact support, so that equipment connectors of switchgear arranged on the base housing can be brought into direct electrically conducting contact with the connecting contacts.

The installation and support of a spring element in the unit of the contact support and the connecting contact is in accordance with one embodiment, the part of the contact support closing off the chamber toward the bottom and has a blind bore for a helical spring facing the suspension hook, whose lower end is supported on the top of the center section of the connecting contact.

If the bus bar, together with the connecting contact, provides a fixed reference point, the helical spring pushes the contact support upward, for example, pushes the upper end section of the connecting contact against the contact rail inserted into the chamber, or against an equipment contact resting on the contact rail.

So that there is sufficient space in the snap-in receiver void of the base housing for the section of the connecting contact vertically adjoining the upper end section, the portion of the contact support is made cuboid in shape and, on its sides extending vertically with respect to the contact rail receptacles, is respectively offset in relation to the facing sides of the snap-in receiver void by the thickness of the section of the connecting contact vertically adjoining the upper end section. This has the additional advantage that the contact support can be snapped into the snap-in receptacles of the base housing in two positions, which are rotated by 180° with respect to each other.

By means of an embodiment which is distinguished because the section of the connecting contact closing off the receptacle at the lower end section rests against the vertical wall of the suspension hook closing off the receptacle, the guidance of the connecting contact is improved in the area of the suspension hook.

BRIEF DESCRIPTION OF THE DRAWINGS

This invention will be described in greater detail by means of an exemplary embodiment represented in the drawings, wherein:

FIG. 2 is a top view of the contact support;

FIG. 3 is an elevation of the contact support along line 3—3 of FIG. 2;

FIG. 4 is an elevation of the contact support along line 4—4 of FIG. 2 and showing the S-shaped connecting contact, the connecting rail, and the helical spring in relation thereto;

DESCRIPTION OF PREFERRED EMBODIMENTS

Figure 1:
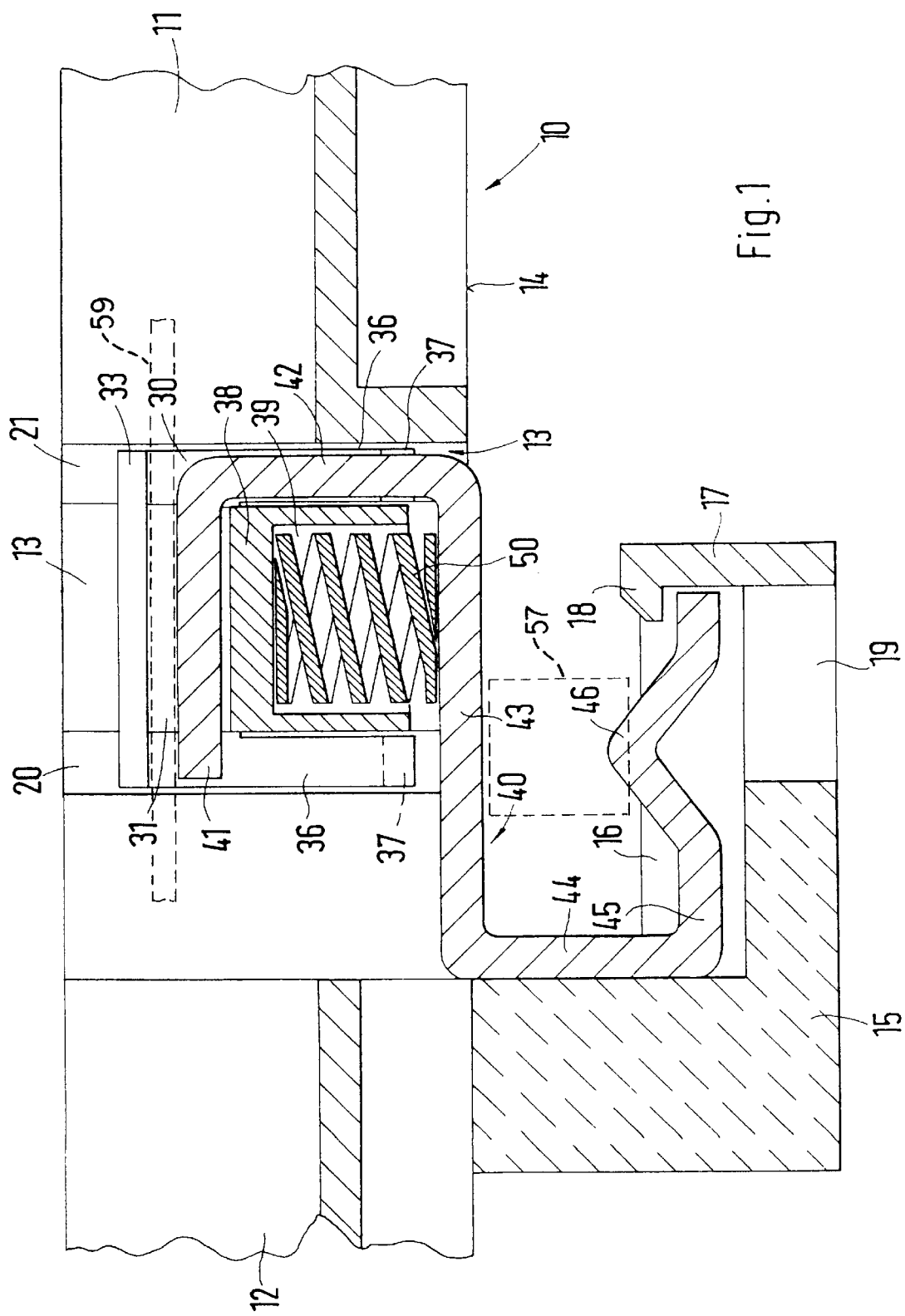
FIG. 1 is an enlarged partial section taken through the base housing of an adapter with the unit having the contact support and the connecting contact inserted into a snap-in receptacle, and showing the relative positions of the contact rail and the buss bar in phantom.

The basic structure of the base housing 10 is determined by the number and spacing of the bus bars in the bus bar system. Respectively longitudinally oriented contact rail receptacles are formed in the top of the base housing 10 which, as shown in FIG. 1, terminate with the sections 11 and 12 in a snap-in receiver void 13 in the area of the formed-on suspension hooks 15 of the base housing 10. On its sides aligned parallel with the contact rail receptacles 11, 12, this snap-in receiver void 13 has formed-in, vertical guide grooves 20 and 21 for pairs of snap-in springs 34 and 36 with outward oriented snap-in shoulders 35 and 37 formed on a contact support 30 in accordance with FIGS. 2 to 4. The walls of the snap-in receiver voids 13 with the guide grooves 20 and 21 support snap-in receptacles, into which the snap-on shoulders 35 and 37 are snapped, but which permit a limited vertical displacement of the contact support 30 in the snap-in receiver void 13. The snap-in shoulders 35 and 37 of the snap-in springs 34 and 36 can also extend behind the underside 14 of the base housing 10 and thus fix the upper end position of the contact support 30.

Figure 5:
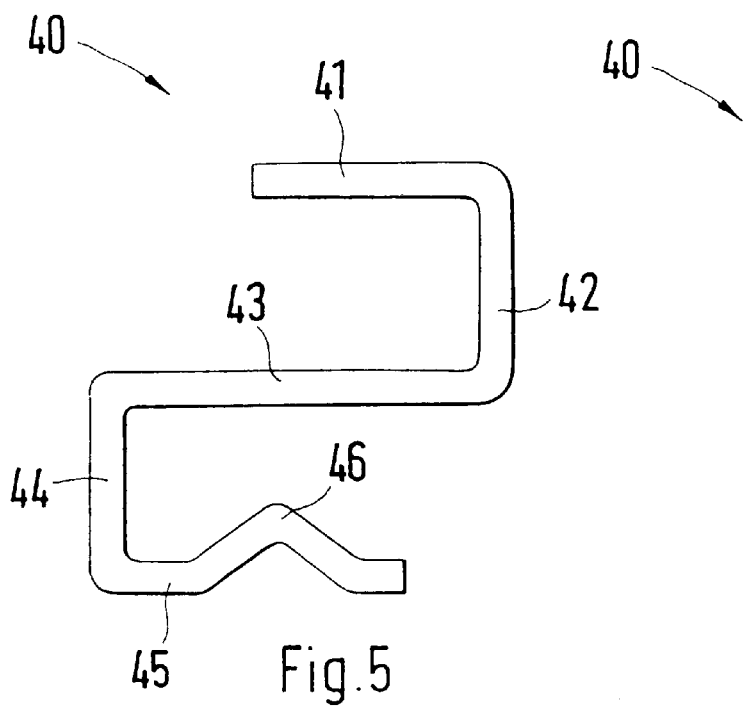
FIG. 5 is a detailed elevation of the S-shaped connecting contact seen in FIG. 1.
Figure 7:
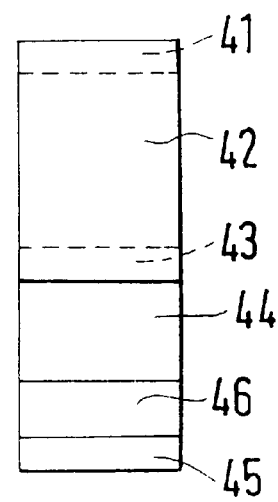
FIG. 7 is a right side elevation of FIG. 5.
Figure 6:
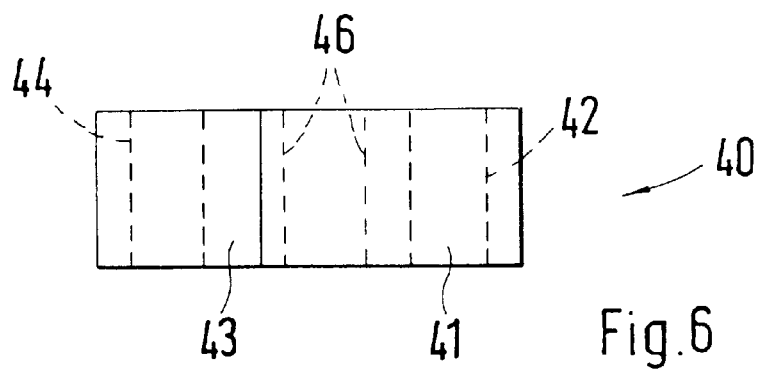
FIG. 6 is a top plan view of FIG. 5.

Before the contact support 30 is snapped into the snap-in receiver void 13, the S-shaped connecting contact 40 in accordance with FIGS. 5 to 7 and the spring element 50 embodied as a helical spring are assembled into a pre-assembled unit. In the upper area, the contact support 30 has a chamber 31 aligned in the longitudinal direction of the contact rail receptacle 11, 12, which is closed toward the top by two support strips 32 and 33. As shown in FIG. 4, the support strips 32 and 33 are aligned in the longitudinal direction of the contact rail receptacle 11, 12 and, from the top of the base housing 10, provide access to the chamber 31, into which the upper end section 41 of the connecting contacts 40 is inserted. A blind bore 39 is cut into the lower section 38 of the contact support 30, which is embodied to be cuboid, which receives a helical spring constituting the spring element 50. All sections 41 to 45 of the connecting contact 40 are bent at right angles with respect to each other, so that the upper end section 41, upper vertical section 42 and center section 43 enclose the contact support 30 on three sides. So that there is space for the section 42 of the connecting contact 40 in the snap-in receiver void 13, at both sides, which extend vertically with respect to the contact rail receptacles 11 and 12, the portion 39 of the contact support 30 is set back in relation to the facing sides of the snap-in receiver void 13 by the thickness of the section 42, for example the thickness of the connecting contact material. Therefore the contact body 30 is symmetrical and can be inserted in two positions, which are rotated by 180°. The blind bore 39 in the element 38 is open in the direction toward the center section 43 of the connecting contact 40, so that the inserted helical spring is supported on the element 38 of the contact support 30 and the center section 43 of the connecting contact 40.

Once the contact support 30 is snapped into the snap-in receiver void 13, the lower vertical section 44 of the connecting contact 40 is guided on the facing side of the suspension hook 15, and the lower end section 45 with the contact point 46 bent upward in a V-shape is inserted and snapped into the receptacle 16 in the suspension hook 15. Thus, the connecting contact 40 is definitely maintained and positioned in the suspension hook 15. The snap-in shoulder 18 on the free end 17 of the suspension hook 15 secures and limits the lower end section 45 of the connecting contact 40 toward the top. The disengagement of the snap-in shoulder 18 is simplified because of the opening 19 in the suspension hook 15. The lower end section 45 projects out of the receptacle 16 of the suspension hook 15 with the contact point 46, and is at a distance from the underside of the center section 43 of the connecting contact 40 which is less than the thickness of the bus bar 57 on which the adapter is fixed in place. When the bus bar 57 is inserted between the contact point 46 and the center section 43, the lower end section 45 can yield and is placed under tension against the bus bar 57 in order to provide a definite electrical contact between the bus bar 57 and the connecting contact 40. The helical spring pushes the contact body 30 far upward, since the inserted upper end section 41 of the connecting contact 40 is pressed against the contact rail 59 located above in the chamber 31 in order to also provide a definite electrical contact between the connecting contact 40 and the contact rail 59.

What is claimed is:

1. In an adapter for a base housing, to which plurality of suspension hooks is attached, and which is accessible for insertion of contact rails through contact rail receptacles and connecting the contact rails with the bus bars, the improvement comprising:

in an area of the plurality of suspension hooks (15) the contact rail receptacles (11, 12) having a plurality of snap-in receiver voids (13) for receiving contact supports (30) having snap-in springs (34, 36), between which is held an S-shaped connecting contact (40) with an upper end section (41), an upper vertical section (42), a center section (43), a lower vertical section (44) and a lower end section (45), the sections (41 to 45) placed at right angles with respect to each other;

the contact support (30) being fixedly placed in the receiver void (13) with the connecting contacts (40) being vertically displaceable under spring tension;

the upper end section (41) confined within a chamber (31) of the contact support (30) which is aligned with the contact rail receptacles (11, 12) and has additional space for the introduction of a contact rail; and the lower end section (45) maintained in a receptacle (16) within the suspension hook and facing an underside (14) of the base housing (10) and projecting from the receptacle (16) with a contact point (46).

2. The adapter in accordance with claim 1, wherein the suspension hook (15) has a snap-in receptacle with a snap-in shoulder (18) facing a front end of the lower end section (45) of the connecting contact (40).

3. The adapter in accordance with claim 2, wherein the suspension hook (15) has an opening (19) below the snap-in shoulder (18).

4. The adapter in accordance with claim 3, wherein the lower end section (45) of the connecting contact (40) is bent upward in a V-shape for forming the contact point (46).

5. The adapter in accordance with claim 4, wherein on sides oriented parallel with the contact rail receptacles (11, 12) the contact support (30) has two snap-in springs (34, 36) with outward oriented shoulders (35, 37) for engaging the base housing (10).

6. The adapter in accordance with claim 5, wherein a cover wall which closes off the chamber (31) of the contact support (30) toward a top thereof is divided into two support strips (32, 33).

7. The adapter in accordance with claim 6, wherein a lower section (38) of the contact support (30) has a blind bore (39) containing a spring (50), spring facing the suspension hook (15) and having a lower end supported on the center section (43) of the connecting contact (40).

8. The adapter in accordance with claim 7, wherein the lower section (38) of the contact support (30) is cuboid in shape and on sides extends vertically with respect to the contact rail receptacles (11, 12) is respectively offset in relation to the facing sides of the snap-in [receivers] receiver voids (13) by a thickness of] the upper vertical section (42) of the connecting contact (40) and the adjoining upper end section (41) are contained within the contact support (30).

9. The adapter in accordance with claim 8, wherein the lower vertical section (44) of the connecting contact (40) rests against a vertical wall of the suspension hook (15).

10. The adapter in accordance with claim 1, wherein the lower end section (45) of the connecting contact (40) is bent upward in a V-shape for forming the contact point (46).

11. The adapter in accordance with claim 1, wherein on sides oriented parallel with the contact rail receptacles (11, 12) the contact support (30) has two snap-in springs (34, 36) with outward oriented shoulders (35, 37) for engaging the base housing (10).

12. The adapter in accordance with claim 1, wherein a cover wall closes off the chamber (31) of the contact support (30) toward a top thereof and is divided into two support strips (32, 33).

13. The adapter in accordance with claim 1, wherein a lower section (38) of the contact support (30) has a blind bore (39) containing a spring (50) the spring facing the suspension hook (15) and having a lower end supported on the center section (43) of the connecting contact (40).

14. The adapter in accordance with claim 13, wherein the part (38) of the contact support (30) is cuboid in shape and on sides extends vertically with respect to the contact rail receptacles (11, 12) is respectively offset in relation to the facing sides of the snap-in receiver voids (13) by the upper vertical section (42) of the connecting contact (40) and the adjoining the upper end section (41) are contained within the contact support 30.

15. The adapter in accordance with claim 1, wherein the lower vertical section (44) of the connecting contact (40) rests against a vertical wall of the suspension hook (15).

* * * * *